United States Patent
Lee et al.

(10) Patent No.: US 8,896,949 B1
(45) Date of Patent: Nov. 25, 2014

(54) DISK DRIVE EMPLOYING GENERAL NOISE WHITENING FILTER TO REDUCE LENGTH OF DATA DEPENDENT NOISE WHITENING FILTERS

(71) Applicant: Western Digital Technologies, Inc., Irvine, CA (US)

(72) Inventors: Patrick J. Lee, San Jose, CA (US); Manmohan K. Sharma, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/789,071

(22) Filed: Mar. 7, 2013

(51) Int. Cl.
*G11B 20/10* (2006.01)
*G11B 20/24* (2006.01)

(52) U.S. Cl.
CPC .................................... *G11B 20/24* (2013.01)
USPC ........................................................... 360/39

(58) Field of Classification Search
None
See application file for complete search history.

(56) References Cited

U.S. PATENT DOCUMENTS

| | | |
|---|---|---|
| 6,104,766 A | 8/2000 | Coker et al. |
| 6,470,047 B1 | 10/2002 | Kleinerman et al. |
| 6,862,326 B1 | 3/2005 | Eran et al. |
| 7,173,783 B1 | 2/2007 | McEwen et al. |
| 7,212,593 B2 | 5/2007 | He |
| 7,286,595 B2 | 10/2007 | Cideciyan et al. |
| 7,424,074 B2 | 9/2008 | Lee et al. |
| 7,471,746 B2 | 12/2008 | Radich |
| 7,522,367 B2 | 4/2009 | Eleftheriou et al. |
| 7,561,640 B2 | 7/2009 | Kaynak et al. |
| 7,738,201 B2 | 6/2010 | Jin et al. |
| 7,948,703 B1 | 5/2011 | Yang |
| 8,271,863 B2 | 9/2012 | Yang et al. |
| 2008/0192378 A1 | 8/2008 | Bliss et al. |
| 2010/0067621 A1 | 3/2010 | Noeldner et al. |
| 2010/0085849 A1 | 4/2010 | Yin et al. |
| 2011/0242692 A1 | 10/2011 | Blinick et al. |
| 2011/0246864 A1 | 10/2011 | Eleftheriou et al. |
| 2012/0089657 A1 | 4/2012 | Yang et al. |
| 2012/0120784 A1 | 5/2012 | Yang et al. |

*Primary Examiner* — Wayne Young
*Assistant Examiner* — Mark Fischer

(57) ABSTRACT

A disk drive is disclosed comprising a head actuated over a disk, wherein data is read from the disk to generate a read signal. The read signal is sampled to generate signal samples, and the signal samples are filtered with an equalizer filter to generate equalized samples. The equalized samples are filtered with a general noise whitening filter to generate general noise whitened samples. The general noise-whitened samples are filtered with a bank of data dependent noise whitening filters to generate data dependent noise whitened samples, and a data sequence is detected from the data dependent noise whitened samples.

6 Claims, 4 Drawing Sheets

DISK DRIVE EMPLOYING GENERAL NOISE WHITENING FILTER TO REDUCE LENGTH OF DATA DEPENDENT NOISE WHITENING FILTERS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

Data is typically written to data sectors within a data track by modulating the write current of a write element, for example, using a non-return to zero (NRZ) encoding where a binary "1" is written using positive write current (+1) and a binary "0" is written using a negative write current (−1), thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

A common demodulation technique employed in disk drives is known as partial response maximum likelihood (PRML), wherein the recording channel is equalized into a desired partial response (e.g., PR4, EPR4, etc.), the resulting read signal sampled, and the signal samples demodulated using a ML data detector. The ML data detector is commonly implemented using the well known Viterbi data detector which attempts to find the minimum distance sequence (in Euclidean space) through a trellis. The accuracy of a Viterbi data detector matches a true ML data detector only if the signal noise is time invariant (data independent) and white (statistically independent) with a Gaussian probability distribution.

In the magnetic recording channel of a disk drive, the signal noise is neither data dependent nor white, and therefore signal processing techniques have been employed to improve the accuracy of the ML data detector by compensating for the data dependent, non-white noise in the read signal. For example, the prior art has employed a bank of data dependent noise whitening filters in front of the ML detector that each attempt to whiten the signal noise based on an optimal noise-whitening function for each possible recorded data sequence.

The output of each data dependent noise whitening filter is then used to compute the corresponding branch metrics in the ML detector (e.g., for each branch corresponding to the data sequence assigned to each data dependent noise whitening filter). Since the noise correlating effect of the recording channel (including the equalizer filter) is essentially infinite, the performance of each data dependent noise whitening filter increases as the length of the corresponding data sequence increases. However, the number of data dependent noise whitening filters also doubles with each additional bit in the data sequence (e.g., there are $2^N$ data dependent noise whitening filters where N is the length of the data sequence). It is therefore desirable to improve the performance of a data dependent noise whitening filter bank without increasing the length of the data dependent sequence and corresponding size of the filter bank.

DETAILED DESCRIPTION

Figure 1:
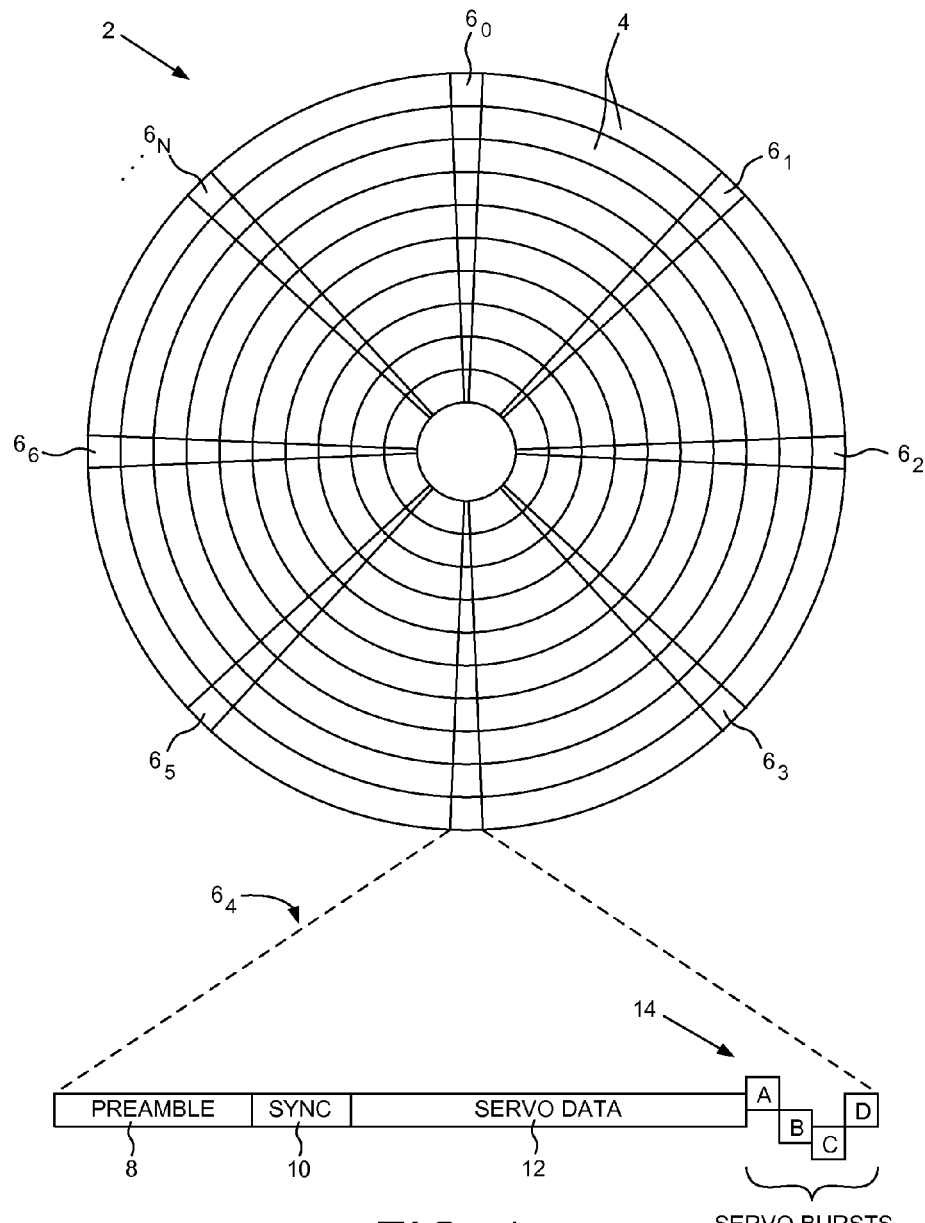
FIG. 1 shows a prior art disk format comprising a plurality of servo tracks defined by servo sectors.
Figure 2:
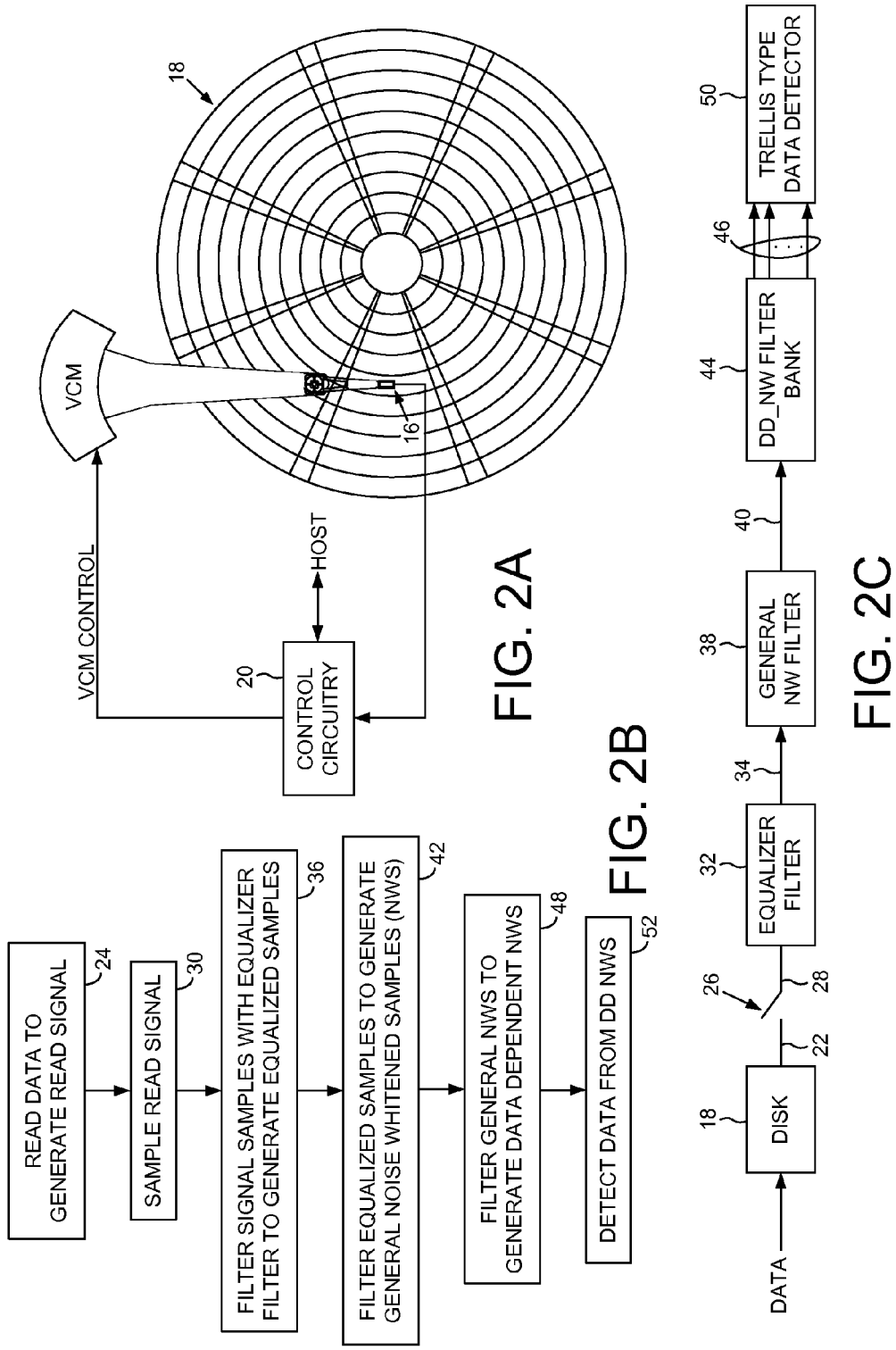
FIG. 2A shows a disk drive according to an embodiment comprising a head actuated over a disk.
FIG. 2B is a flow diagram according to an embodiment wherein a read signal is sampled, and the signal samples are equalized and then whitened with a general noise whitening filter and then with a bank of data dependent noise whitening filters.
FIG. 2C shows control circuitry according to an embodiment including an equalizer filter, a general noise whitening filter, a bank of data dependent noise whitening filters, and a trellis type data detector.

FIG. 2A shows a disk drive according to an embodiment comprising a head 16 actuated over a disk 18, and control circuitry 20 operable to execute the flow diagram of FIG. 2B with reference to FIG. 2C. Data is read from the disk 18 to generate a read signal 22 (block 24), and the read signal 22 is sampled 26 to generate signal samples 28 (block 30). The signal samples 28 are filtered with an equalizer filter 32 to generate equalized samples 34 (block 36), and the equalized samples 34 are filtered with a general noise whitening filter 38 to generate general noise whitened samples 40 (block 42). The general noise-whitened samples 40 are filtered with a bank of data dependent noise whitening filters 44 to generate data dependent noise whitened samples 46 (block 48), and a data sequence is detected 50 from the data dependent noise whitened samples 46 (block 52).

The equalizer filter 32 may filter the signal samples 28 according to any suitable response, such as a suitable partial response (e.g., PR4, EPR4, etc.). In one embodiment, the target response of the equalizer filter 32 may be adapted toward a response that achieves a desirable quality metric, such as a response that minimizes an error between the equalized samples and expected samples, or a response that minimizes an error rate of the data detector. In one embodiment, the coefficients of the equalizer filter 32 and the general noise whitening filter 38 may be adapted to optimize a suitable quality metric.

Any suitable general noise whitening filter 38 may be employed, wherein in one embodiment the general noise whitening filter 38 is of the form:

$$W(D)=1-P(D)$$

where the D operator corresponds to a delay of one signal sample, and P(D) represents an optimal noise prediction filter. In one embodiment, the general noise whitening filter 38 is implemented as a finite impulse response filter of the form:

$$1-p_1D^1+p_2D^2+p_3D^3$$

where $\{p_1, p_2, p_3 \ldots\}$ are coefficients of the prediction filter that may be determined using any suitable technique. For example, the coefficients of the noise whitening filter may be adapted so as to minimize the prediction error:

$$e(D)=n(D)-n'(D)$$

where n(D) represents the noise in the equalized signal samples 34 and n'(D) represents the output of the prediction filter P(D).

Figure 4A:
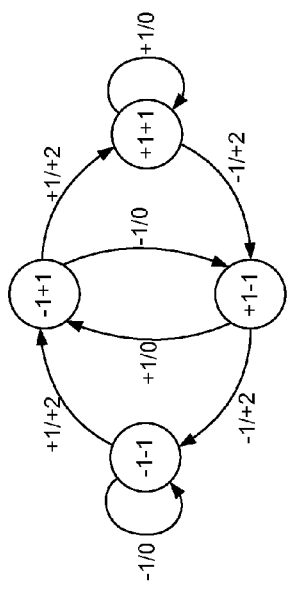
FIG. 4A shows a state transition diagram for a PR4 target.

In the embodiment of FIG. 2C, the data detector 50 comprises a trellis type data detector that performs a maximum likelihood sequence estimation (MLSE) based on a target that is matched to the combination of the equalizer filter 32 and the general noise whitening filter 38. For example, FIG. 4A shows a state transition diagram for a trellis type data detector matched to a PR4 target $1-D^2$ (e.g., without employing the general noise whitening filter 38). The branches connecting the states in the PR4 state transition diagram of FIG. 4 are labeled with y/x, where y represents the recorded binary data (NRZ encoded) and x represents the corresponding ideal signal sample.

Figure 4B:
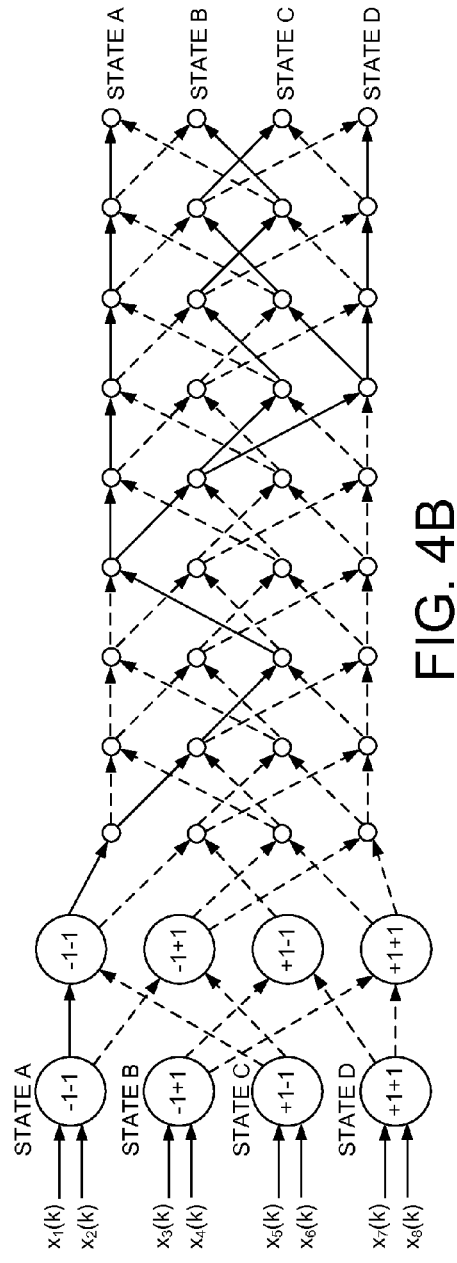
FIG. 4B shows an embodiment wherein the trellis for a PR4 target is modified so that the branch metrics of each state are generated based on the outputs of the data dependent noise whitening filters.

FIG. 4B shows a trellis corresponding to the PR4 state transition diagram, including a plurality of survivor sequences (solid lines) through the trellis which eventually merge into a single survivor sequence. That is, the survivor sequences will eventually merge into a single survivor sequence through the trellis which represents the minimum distance sequence (in Euclidean space). When the general noise whitening filter 38 is included in the signal path as shown in FIG. 2C, the state transition diagram is modified accordingly to match the generalized PR target $(1-D^2)W(D)$. The general noise whitening filter 38 has an order of L, and therefore the number of states in the state transition diagram increases from $2^2$ to $2^{2+L}$. Since the optimal noise whitening filter may comprise an infinitely long impulse response, in one embodiment the order L of the general noise whitening filter is constrained so as to constrain the complexity of the corresponding state transition diagram.

Figure 3:
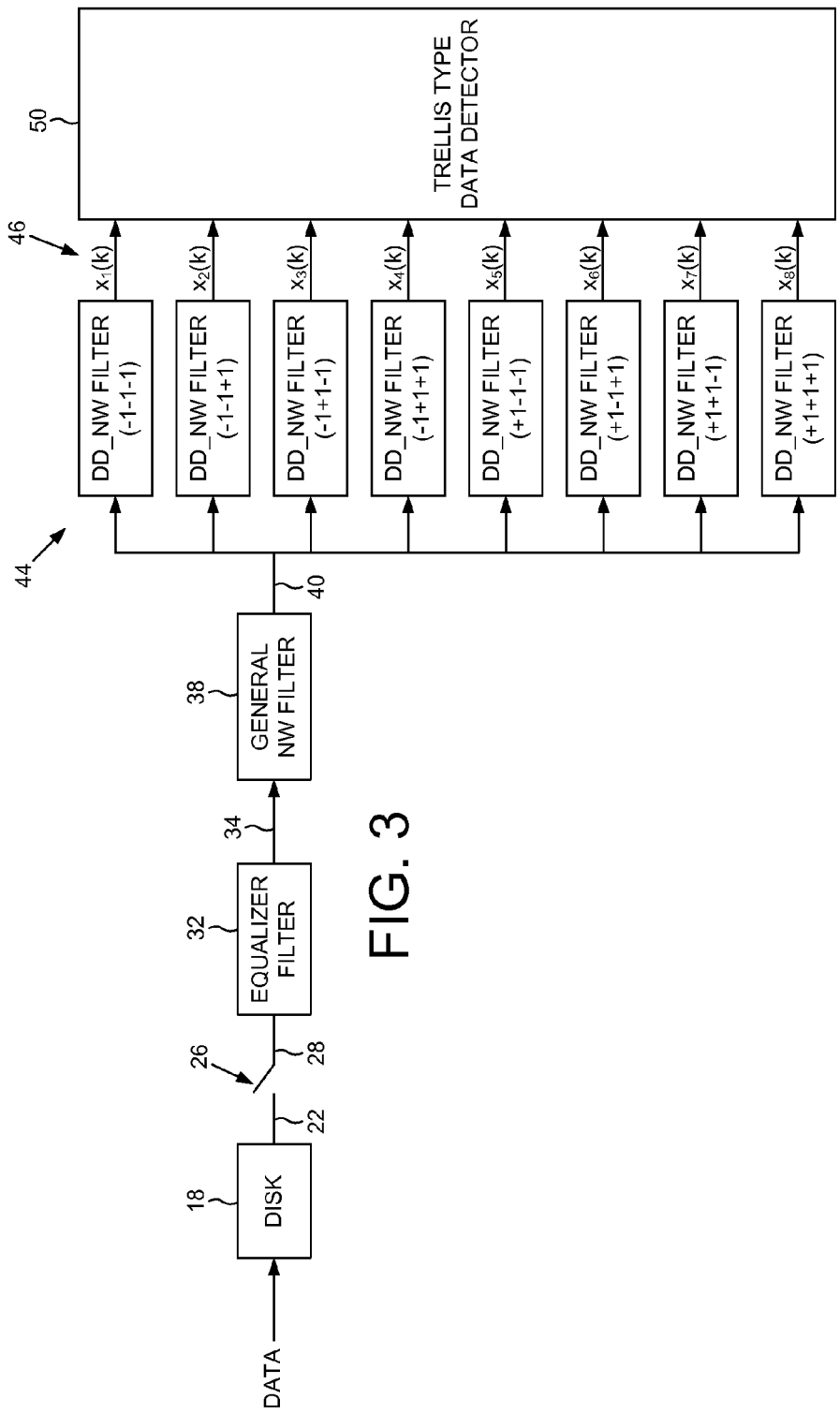
FIG. 3 shows an embodiment wherein eight data dependent noise whitening filters are employed which corresponds to three consecutive signal samples.

FIG. 3 shows an embodiment wherein the bank of data dependent noise whitening filters 44 comprises eight filters corresponding to three consecutive signal samples (and three consecutive recorded NRZ bits). Other embodiments may include different numbers of filters. Each data dependent noise whitening filter may implement a polynomial similar to the general noise whitening filter 38 described above. In one embodiment, the data dependent noise whitening filters may be adapted using the general noise whitened samples 40 that correspond to the merged survivor path selected by the trellis as described above. That is, once a data sequence has been detected by the data detector 50, the corresponding ideal signal samples of the generalized PR target and the buffered general noise whitened samples 40 may be used to adapt the corresponding data dependent noise whitening filter. The merged survivor path selected by the trellis may also be used to adapt the coefficients of the equalizer filter 32 and/or the coefficients of the general noise whitening filter 38.

In another embodiment, the equalizer filter 32, general noise whitening filter 38, and/or the data dependent noise whitening filters 44 may be adapted during a calibration procedure wherein a test pattern is written to and read from the disk. The coefficients of at least one of the filters may be adapted based on ideal signal samples generated by convolving the test pattern with the channel response (predetermined or identified) up to the output of the filter, wherein the coefficients may be adapted based on a difference between the ideal signal samples and the signal samples output by the filter. When adapting the data dependent noise whitening filters 44, the test pattern may also be used to select which filter is updated as each signal sample is processed.

In one embodiment, the data detector 50 utilizes the data dependent noise whitened samples 46 in order to compute the branch metrics for each state in the trellis at each signal sample instance. This is illustrated in the simplified trellis of FIG. 4B which corresponds to the simple PR4 target (in practice the number of states in the trellis would increase due to a more complex PR target together with the combined response of the general noise whitening filter described above). In the PR4 example of FIG. 4B, each state of the trellis corresponds to the most recent two signal samples (and two recorded NRZ bits), and each state of the trellis computes a branch metric corresponding to the next possible recorded NRZ bit (−1 or +1). The signal sample used to compute each branch metric is determined by the output of the corresponding data dependent noise whitening filter. For example, for STATE A (−1−1) the branch corresponding to the next recorded bit being −1 is computed based on the output $x_1(k)$ of the first data dependent noise whitening filter, and the branch corresponding to the next recorded bit being +1 is computed based on the output $x_2(k)$ of the second data dependent noise whitening filter. In one embodiment, the branch metric is computed based on the square of the difference between the data dependent noise whitened signal sample and the corresponding ideal signal sample corresponding to the general PR target. The minimum branch metric is then selected for each state to grow each survivor sequence, and this selection process eventually causes the survivor sequences to merge into a single survivor sequence as illustrated in FIG. 4B.

Similar to the general noise whitening filter 38, the optimality of each of the data dependent noise whitening filters may depend on the length of the corresponding impulse response. However, as the impulse response is increased by one data bit in the data sequence, the number of data dependent noise whitening filters in the bank 44 doubles. Accordingly, in one embodiment the order of the general noise whitening filter 38 and the order of the data dependent noise whitening filters 44 are selected so as to provide a desired level of performance for the data detector 50 while also constraining the complexity of the general PR state transition diagram as well as constrain the number of data dependent noise whitening filters 44. In one embodiment, combining a general noise whitening filter 38 with the bank of data dependent noise whitening filters 44 provides a performance increase with a lower level of complexity as compared to a similar performance increase achieved using only a general noise whitening filter, or using only a bank of data dependent noise whitening filters.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head actuated over the disk; and
   control circuitry operable to:
      read data from the disk to generate a read signal;
      sample the read signal to generate signal samples;
      filter the signal samples with an equalizer filter to generate equalized samples;
      filter the equalized samples with a general noise whitening filter independent of any data pattern generated by a sequence detector to generate general noise whitened samples;
      filter the general noise-whitened samples with a bank of data dependent noise whitening filters to generate data dependent noise whitened samples; and
      detect a data sequence from the data dependent noise whitened samples.

2. The disk drive as recited in claim 1, wherein the control circuitry comprises a trellis type data detector operable to detect the data sequence, wherein the trellis type data detector comprises a target substantially matched to a channel response represented by an output of the general noise whitening filter.

3. The disk drive as recited in claim 2, wherein:
   the trellis type data detector comprises a plurality of states;
   each state generates at least two branch metrics; and
   each state is responsive to an output of at least two of the data dependent noise whitening filters.

4. A method of operating a disk drive comprising a head actuated over a disk, the method comprising:
   reading data from the disk to generate a read signal;
   sampling the read signal to generate signal samples;
   filtering the signal samples with an equalizer filter to generate equalized samples;
   filtering the equalized samples with a general noise whitening filter independent of any data pattern generated by a sequence detector to generate general noise whitened samples;
   filtering the general noise-whitened samples with a bank of data dependent noise whitening filters to generate data dependent noise whitened samples; and
   detecting a data sequence from the data dependent noise whitened samples.

5. The method as recited in claim 4, further comprising detecting the data sequence using a trellis type data detector comprising a target substantially matched to a channel response represented by an output of the general noise whitening filter.

6. The method as recited in claim 5, wherein:
   the trellis type data detector comprises a plurality of states;
   each state generates at least two branch metrics; and
   each state is responsive to an output of at least two of the data dependent noise whitening filters.

* * * * *